Oct. 6, 1970 — W. H. WILKINSON — 3,532,274

GAS TURBINE ENGINE

Original Filed June 7, 1967 — 2 Sheets-Sheet 1

Inventor
Wilfred Henry Wilkinson
By
Cushman, Darby & Cushman
Attorneys

United States Patent Office 3,532,274
Patented Oct. 6, 1970

3,532,274
GAS TURBINE ENGINE
Wilfred Henry Wilkinson, Turnditch, Derby, England, assignor to Rolls-Royce Limited, Derby, England, a British company
Continuation of application Ser. No. 644,284, June 7, 1967. This application Apr. 14, 1969, Ser. No. 817,270
Claims priority, application Great Britain, June 17, 1966, 27,150/66
Int. Cl. B64d 33/04; B63h 11/00
U.S. Cl. 239—265.11        15 Claims

ABSTRACT OF THE DISCLOSURE

A gas turbine engine has an annular array of exhaust nozzles each of which has a flange at its upstream end which is received within a channel within which it has some radial freedom of movement. The channel is defined in part by the engine casing and the construction ensures that bending stresses from the engine casing are not transmitted to the exhaust nozzles.

---

Figure 1:
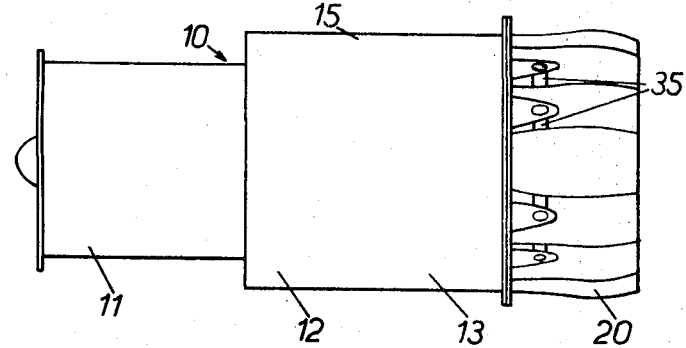

This is a continuation of Ser. No. 644,284 filed June 7, 1967, now abandoned.

This invention concerns a gas turbine engine.

According to the present invention, there is provided a gas turbine engine having a structure comprising coaxially inner and radially outer casings and a plurality of exhaust nozzles angularly spaced apart in an annular array and diametrically extending between said casings, a means for locating each of said nozzles non-rigidly connecting said nozzles to said casing structure, said means for locating being adapted to fixedly locate each nozzle axially of said casing structure and to locate each nozzle radially of said casing structure in a manner permitting substantial radial movement thereof relative to said casing structure thereby reducing the transmission of bending stresses between said casing structure and each of said nozzles.

If, in contrast to the present invention, each exhaust nozzle were rigidly connected to the casing structure, e.g. by bolts, bending stresses would be readily transmitted thereto from the casing structure and this would be particularly inconvenient if the exhaust nozzle or nozzles were brittle, e.g. by reason of being formed of refractory material such as silicon nitride or other ceramic material.

The or each exhaust nozzle may be provided at its upstream end with at least one radially extending flange the or each of which is received within a channel which is defined, at least in part, by a part of the locating means.

Thus, the or each said channel may be defined between adjacent parts of the casing structure and of the locating means.

The locating means may comprise one or more members which is or are rigidly secured to the casing structure.

The said flange, or at least some of the said flanges, may have some radial freedom of movement in the respective channel or channels.

A radially extending pipe may be disposed between each adjacent pair of exhaust nozzles, and there may be means for providing the radially outer ends of the pipes with cooling air, the radially inner ends of the pipes communicating with the interior of the exhaust cone to direct cooling air to the latter.

The locating means may comprise a plurality of angularly spaced apart plates each of which is bolted to the outer casing and is secured to the radially outer end of the respective pipe.

Load transmitting means may be provided between the exhaust nozzles downstream of the upstream ends thereof.

The means for locating each of said nozzles may be adapted to radially locate each of said nozzles relative to one of said casings and includes means to permit each nozzle significant radial freedom of movement relative to the other casing.

The one casing may be the inner casing.

The means for locating may comprise an exhaust cone, means securing said exhaust cone to said inner casing, said inner casing and said exhaust cone defining said means to radially locate each nozzle relative to said inner casing.

In another aspect, the invention provides a gas turbine engine having casing structure, nozzle locating means, and a plurality of exhaust nozzles angularly spaced apart in an annular array, each exhaust nozzle being non-rigidly connected to the casing structure by the nozzle locating means for reducing the transmission of bending stresses between said casing structure and each said exhaust nozzle and load equalizing means extending between said exhaust nozzles downstream of said nozzle locating means.

The load equalizing means may comprise load transmitting springs.

Figure 2:
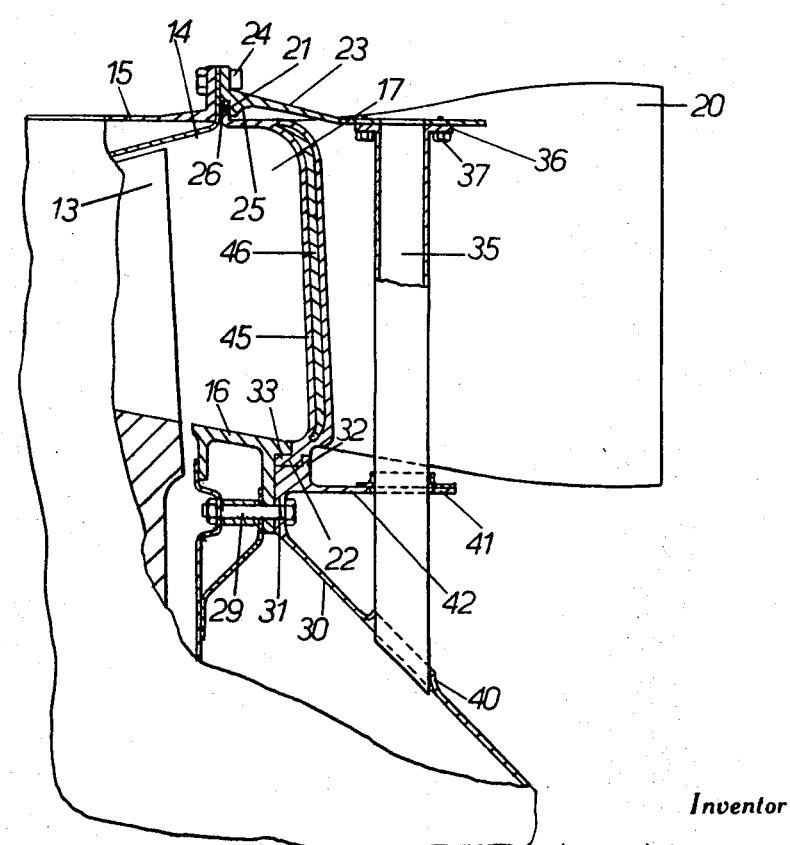
Figure 3:
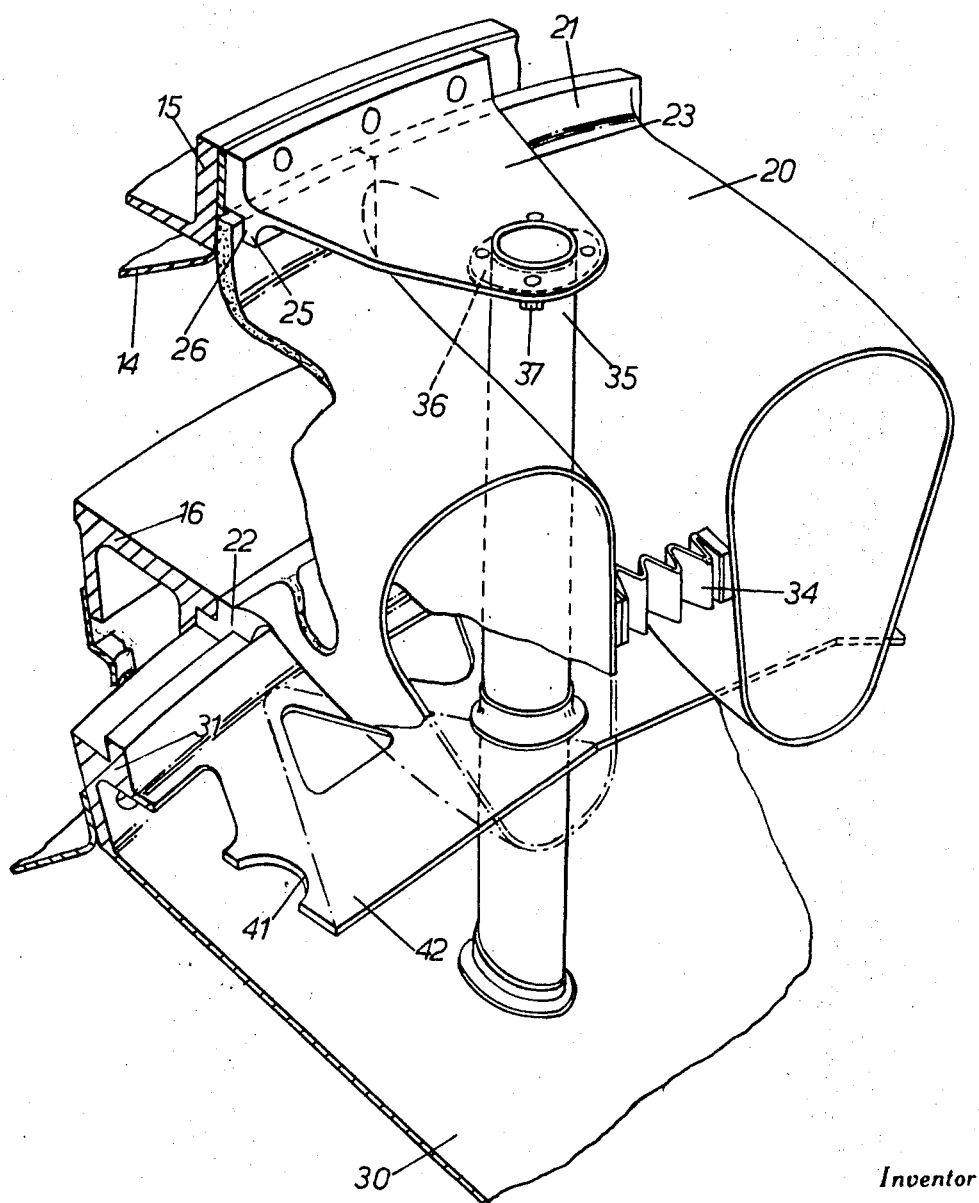

The invention is illustrated, merely by way of example, in the accompanying drawings, in which:

FIG. 1 is a diagrammatic view of a gas turbine engine according to the present invention, FIG. 2 is a broken-away sectional view on a larger scale of part of the engine shown in FIG. 1, and FIG. 3 is a broken-away perspective view of part of the engine shown in FIG. 1.

Referring to the drawings, a gas turbine engine 10 comprises in flow series a compressor 11, combustion equipment 12 and a turbine 13. The turbine 13 is mounted within a casing member 14 (FIGS. 2 and 3) which is itself disposed within the outer casing 15 of the engine.

The engine 10 also has an inner casing 16 which is disposed concentrically within the outer casing 15 and which defines therewith an annular duct 17 through which the exhaust gases of the engine may pass.

At the downstream end of the engine 10, there are mounted a plurality, (e.g. nine) of exhaust nozzles 20 which are arranged to receive the exhaust gas flow from the annular duct 17 and which are angularly spaced apart from each other in an annular array. Each of the exhaust nozzles 20 may be formed of a cast metal, e.g. of a nickel based alloy or may be formed of a refractory material such, for example, as silicon nitride or other ceramic material.

Each of the exhaust nozzles 20 is of subsbtantially elliptical cross-sectional shape and has its major axis arranged substantially radially of the engine 10. The upstream end of each exhaust nozzle 20 is provided adjacent its radially inner and radially outer ends with radially extending flanges 22, 21 respectively.

A plurality of angularly spaced apart plates 23, one for each of the exhaust nozzles 20, is bolted by means of bolts 24 to the casing member 14 and to the outer casing 15. Each of the plates 23 is provided adjacent its upstream end with a radially inwardly extending flange 25, the flange 25 defining, with the adjacent part of the casing member 14, a part-annular channel 26 in which the respective flange 21 is received. As will be seen most clearly from FIG. 2, each of the flanges 21 has some radial freedom of movement in the respective channel 26.

The inner casing 16 is bolted to an exhaust cone 30 having a thickened peripheral portion 31 which is provided with a radially outwardly extending end flange 32.

The thickened peripheral portion 31, together with the flange 32 thereof, defines with the inner casing 16 a channel 33 in which the flange 22 is received and radially located. The thickened peripheral portion 31 is bolted to the inner casing 16 by bolts 29.

The channels 26, 33 serve to locate the exhaust nozzles 20 axially, and also serve to locate them radially, although with some radial freedom. The exhaust nozzles 20 are not, however, rigidly connected to the casings 14–16 and, as a result, bending stresses will not be transmitted as readily from the casings 14–16 to the exhaust nozzles 20 as would otherwise be the case. The parts 23, 31 thus merely act as locating means for the exhaust nozzles 20 in contra-distinction to rigid securing means such as would be provided, for instance, by bolts. The locating means 23, 31 are, however, themselves rigidly secured to the respective casing members 14–16.

Thus, substantially the only stresses to which the exhaust nozzles 20 are subjected are those from the exhaust gases passing therethrough. These stresses are, however, distributed between the various exhaust nozzles by load transmitting springs 34 which are provided between the downstream ends of the exhaust nozzles 20.

Between each adjacent pair of exhaust nozzles 20 there is a radially extending pipe 35 whose radially outer end is provided (by means not shown) with a supply of cooling air from the compressor 11. The radially inner ends of the pipes 35 communicate with the interior of the exhaust cone 30 so as to direct cooling air to the latter. If desired, this cooling air can also be used for the cooling of the turbine 13.

Each of the pipes 35 is provided at its radially outer end with a flange 36 which is bolted by bolts 37 to the downstream end of a respective plate 23.

Each of the pipes 35 is mounted and welded in a hole 40 in the exhaust cone 30 and is also mounted in and welded in a hole 41 in a flange 42 which extends axially downstream from the thickened peripheral portion 31 of the exhaust cone 30.

Each of the exhaust nozzles 20, in each of its side walls, is provided at its upstream end with a recess 45 which forms with the recess 45 of the adjacent exhaust nozzle 20 a gap which receives asbestos or other packing material 46 by means of which the exhaust nozzles 20 are sealed to each other.

In order to assemble the structure shown in the drawings, the exhaust cone 30, with the pipes 35 assembled in place, is supported with the front end thereof pointing vertically upwards. The separate exhaust nozzles 20 are then fitted radially inwardly to permit the flange 22 to engage and rest on the flange 32. The inner casing 16 is now fitted and secured by bolts 29. The separate plates 23 are then fitted to the end of each pipe 35 and lightly retained by bolts 37. A temporary means must be used to retain the flanges 21 of the nozzles 20 in contact with the respective flanges 25 of plates 23, whilst the complete assembly is lowered onto the vertically upwardly mounted casing member 14 of the engine. The bolts 24 are fitted and tightened before finally tightening the bolts 37.

What is claimed is:

1. A gas turbine engine having a structure comprising coaxial radially inner and radially outer casings and a plurality of exhaust nozzles angularly spaced apart in an annular array and extending radially between said casings, a means for locating each of said nozzles nonrigidly connecting said nozzles to said casing structure, said means for locating being adapted to fixedly locate each nozzle axially of said casing structure and to locate each nozzle radially of said casing structure in a manner permitting substantial radial movement thereof relative to said casing structure thereby reducing the transmission of bending stresses between said casing structure and each of said nozzles.

2. The gas turbine engine defined in claim 1 in which each of said exhaust nozzles is provided at its up stream end with at least one radially extending flange, and in which said nozzle locating means includes a channel means for receiving, at least in part, said flange.

3. The gas turbine engine defined in claim 2 in which said channel is defined between adjacent parts of said casing structure and of said nozzle locating means.

4. The gas turbine engine defined in claim 3 in which said nozzle locating means includes at least one member which is rigidly secured to said casing structure.

5. The gas turbine engine defined in claim 2 in which each of said flanges has radial freedom of movement in the respective channel associated therewith.

6. The gas turbine engine as defined in claim 1 in which a radially extending pipe is disposed between each adjacent pair of nozzles and which includes means for providing the radially outer ends of said pipes with cooling air, the radially inner ends of said pipes communicating with the interior of an exhaust cone supported by said inner casing to direct cooling air to the latter.

7. The gas turbine engine defined in claim 6 in which said locating means comprise a plurality of angularly spaced apart plates each of which is bolted to the outer casing and is secured to the radially outer end of the respective pipe.

8. The gas turbine engine defined in claim 1 in which load transmitting means are provided between said exhaust nozzles downstream of the upstream ends thereof.

9. A gas turbine engine as defined in claim 1 wherein said means for locating each of said nozzles is adapted to radially locate each of said nozzles relative to one of said casings and includes means to permit each nozzle significant radial freedom of movement relative to the other casing.

10. A gas turbine engine as defined in claim 9 wherein said one casing is said inner casing.

11. A gas turbine engine as defined in claim 10 wherein said means for locating comprises an exhaust cone, means securing said exhaust cone to said inner casing, said inner casing and said exhaust cone defining said means to radially locate each nozzle relative to said inner casing.

12. In a gas turbine engine having a casing structure comprising radially inner and radially outer coaxial casings, a plurality of exhaust nozzles angularly spaced apart in an annular array and diametrically extending radially between said inner and outer casings, nozzle locating means comprising an exhaust cone supported by said inner casing connecting each of said nozzles nonrigidly to said casing structure, said nozzle locating means being adapted to fixedly locate each nozzle axially of said casing structure and to locate each nozzle radially of said casing structure in a manner permitting substantial radial freedom of movement thereof relative to said casing structure thereby reducing the transmission of bending stresses between said casing structure and each of said nozzles, a radially extending pipe disposed between each adjacent pair of exhaust nozzles, and means for providing the radially outer end of each of said pipes with cooling air, the radially inner ends of the pipes being adapted to communicate with the interior of said exhaust cone to direct cooling air therein.

13. The gas turbine engine defined in claim 12 in which the locating means include a plurality of annularly spaced apart plates each of which is bolted to the outer casing and is secured to the radially outer end of the respective pipe.

14. A gas turbine engine having casing structure, nozzle locating means, and a plurality of exhaust nozzles angularly spaced apart in an annular array, each exhaust nozzle being nonrigidly connected to the casing structure by the nozzle locating means for reducing the transmission of bending stresses between said casing structure and each said exhaust nozzle and load equalizing means extending between said exhaust nozzles downstream of said nozzle locating means.

15. A gas turbine engine as claimed in claim 14 wherein the load equalizing means comprise load transmitting springs.

References Cited

UNITED STATES PATENTS

| | | | |
|---|---|---|---|
| 2,933,891 | 4/1960 | Britt | 239—265.35 |
| 3,090,198 | 5/1963 | Zeisloft | 239—265.35 |
| 3,280,563 | 10/1966 | Bowersett | 239—265.35 |
| 3,302,885 | 2/1967 | Hebert | 239—265.19 |
| 3,354,651 | 11/1967 | Novotny | 239—265.15 |

LLOYD L. KING, Primary Examiner

U.S. Cl. X.R.

239—127.3, 265.19, 265.33